Figure 1:
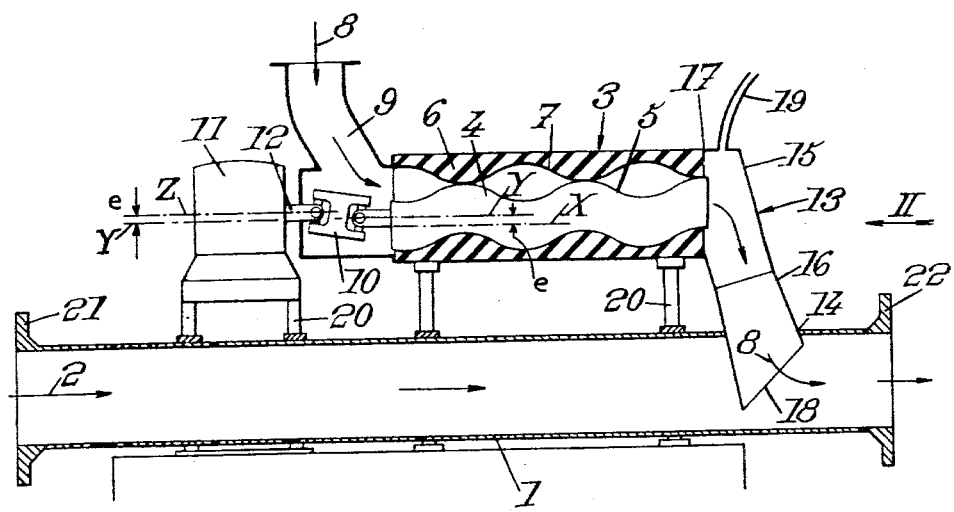

United States Patent [19]

Blatrix

[11] 4,184,793
[45] Jan. 22, 1980

[54] DEVICES FOR THE REMOTE DISTRIBUTION OF MEASURED AMOUNTS OF POWDERY MATERIAL

[75] Inventor: Jean-Pierre Blatrix, Colombes, France

[73] Assignee: Societe Generale de Mecanique et de Metallurgie, Vanves, France

[21] Appl. No.: 850,533

[22] Filed: Nov. 11, 1977

[30] Foreign Application Priority Data

Nov. 23, 1976 [FR] France .................................. 76 35224

[51] Int. Cl.² ............................................. B65G 53/48
[52] U.S. Cl. ................................................... 406/61
[58] Field of Search ....................... 302/25, 40, 50, 51, 302/57

[56] References Cited

U.S. PATENT DOCUMENTS

| 726,664 | 4/1903 | Filson | 302/50 |
| 1,454,979 | 5/1923 | Muhlfeld et al. | 302/51 |

FOREIGN PATENT DOCUMENTS

| 1182288 | 6/1959 | France | 302/57 |
| 493989 | 10/1938 | United Kingdom | 302/50 |

*Primary Examiner*—Jeffrey V. Nase
*Attorney, Agent, or Firm*—Fleit & Jacobson

[57] ABSTRACT

A device for the remote distribution of measured amounts of powdery material using a duct through which passes a pressurized fluid, the duct being fed laterally with product from a feed regulator. The feed regulator, including a "screw pump" that delivers material into a spout having a mouth cut in the form of a whistle.

1 Claim, 2 Drawing Figures

DEVICES FOR THE REMOTE DISTRIBUTION OF MEASURED AMOUNTS OF POWDERY MATERIAL

The invention relates to devices for the transport and remote distribution of measured amounts of powdery or pastry products, these products being either in the form of heaps of loose grains or beads or else in the form of a more or less fine and more or less uniform powder, possibly humidified, the granulometry of this powder being possibly even very fine, as is the case with baking flour, talc or pigments.

Among these devices, those to which the invention relates more particularly are those comprising a transport duct in which flows a fluid, generally pressurised air, and a feed regulator mounted so as to introduce into this duct measured amounts of the product to be distributed, this feed regulator being formed by a pump of the type often called "excentric screw pumps", i.e. formed from two helical gears one inside the other and in contact at all times with one another along at least a continuous line of helical trend, the rotary internal gear, or "rotor", having a number of teeth equal to n (n being a whole number at least equal to 1), the outer fixed gear, or "stator", having a number of teeth equal to n+1 and the pitches of the helixes of the two inner and outer gears being respectively in the ratio n/(n+1).

In currently known devices of this kind, the screw pump is mounted at the upstream end of the duct and the carrier fluid is admitted laterally into this duct downstream of this end.

This arrangement presents a certain number of disadvantages, in particular in so far as the smallness of the transport distance is concerned, owing to the interference effect due to the presence of a fluid over-pressure downstream of the pump, an effect which tends to be opposed to the feeding into the duct of the product to be carried along and which results in any case in a poor distribution of this product in the stream of the carrier fluid.

The invention has as its aim, especially, to remedy these disadvantages by making it possible in particular to transport the product to be distributed over relatively great distances frequently exceeding 100 m.

Distribution devices in accordance with the invention are essentially characterised in that the outlet of the screw pump is connected to a downwardly turned pouring spout plunging laterally into the transport duct through an opening formed in the upper wall thereof, and in that the carrier fluid is fed axially into the duct upstream of said opening.

In preferred embodiments, in addition, one and/or the other of the following arrangements are used:

the downstream end of the spout, disposed inside the duct, is open towards the downstream side of this duct and is surrounded over the whole of its periphery by the flow of carrier fluid, the spout converges towards its downstream discharge opening, the downstream opening of the spout is shaped like a whistle, means are provided for injecting downwards into the spout a pressurised fluid so as to assist the gravity and suction effect for discharging into the transport duct powdery material fed from the screw pump.

The invention comprises, apart from these main arrangements, certain other arrangements which are used preferably at the same time and which will be more explicitly discussed hereafter.

In what follows, there will be described a preferred embodiment of the invention, in a way which is of course in no wise limiting.

FIG. 1 of this drawing shows schematically in vertical section a device constructed according to the invention for remotely distributing measured amounts of a powdery product.

Figure 2:
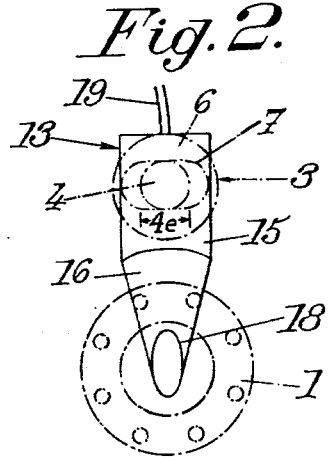

And FIG. 2 shows a constituent part of this device seen from the front in accordance with arrow II of FIG. 1.

The distributing device in question comprises a horizontal cylindrical duct 1 and means for circulating in this duct a pressurised transport fluid, liquid or gaseous, shown by arrow 2.

This device comprises in addition, an "excentric screw pump", such as defined above, known per se.

In the embodiment shown, rotor 4 of this pump, constructed from a rigid material, has an outer surface 5 generated by a circle moving so that the centre of this circle describes a helix and so that its axis X remains constantly parallel to axis Y of said helix, the distance e between the two axes X and Y defining the excentricity of the rotor considered.

Therefore, stator 6 of the pump has an inner surface 7 whose cross section at all points is defined by two arcs of a circle of 180° connected together by two parallel rectilinear segments of a length 4e jointingly overlapping the rotor (FIG. 2).

Of course, as is known in the technique under consideration, the outer surface 5 of the rotor could be different from that defined above, being generated by a helical movement of the same kind as that defined above, but by a plane closed curve other than circular, said curve being defined particularly by arcs of hypocycloids and epicycloids.

A powdery material shown by arrow 8 is fed by gravity into a chamber 9 disposed at one of the two axial ends of the screw pump 3 thus defined.

Rotor 4 of this pump is coupled in rotation, through a double swivel joint 10, to a drive motor 11 whose shaft 12 assumes an axis Z parallel to axis Y defined above and situated at a distance from this axis equal to e.

At its axial end opposite inlet chamber 9, the pump is connected to duct 1 by means of a pouring spout 13 directed downwards and passing vertically through a window 14 provided in the upper wall of said duct 1.

This spout 13 is advantageously formed from two sections sealingly connected together, i.e. an upper cylindrical or prismatic section 15 and a downwardly convergent lower section 16 in the shape of a truncated cone.

The upper section 15 has a circular side opening 17 whose edge is located in a vertical plane and is jointingly adapted to the downstream end of stator 6.

The lower section 16 finishes at the bottom end inside duct 1 in an opening or mouth 18 open towards the downstream side of this duct.

In the embodiment illustrated, the edge of this opening is located in a plane sloping with respect to the horizontal and has an elliptical shape with a small horizontal axis, the lowest portion of this edge being disposed lower than the axis of duct 1 and upstream with respect to the flow direction of fluid 2 in this duct, whereas its highest portion is disposed above said axis: in other words, the downstream end of spout 13 is "cut in the shape of a whistle", which has certain advantages particularly in regard to the creation of a suction effect on the material discharged by this spout into duct 1 and the homogeneity of the distribution of this material in the flow of carrier fluid at a relatively small distance from the discharge zone.

Numerous other shapes could be provided for the pouring spout and particularly for its mouth 18.

Thus the average line of this spout could have the shape of an S, with its downstream end directed substantially along the axis of duct 1.

Likewise, the edge of its downstream mouth could have a shape other than elliptical, e.g. circular, or rectangular, with corners rounded or not.

It is advantageous that this edge is entirely surrounded by the flow of carrier fluid; the suction effect which results therefrom prevents any rising of the fluid into the spout.

Pipe 19 is advantageously mounted so as to pass through the upper wall of the upper section 15 of the spout and to discharge downwards thereinto, which allows a pressurised fluid to be injected downwardly into the spout so as to assist gravity and suction effects for transferring into duct 1 the measured material leaving the pump.

There can also be seen in the drawing:

hoops or bridges 20 supporting pump 3 and motor 11 above duct 1, preferably so that the axes of these elements are horizontal and parallel, and flanges 21 and 22 for connecting respectively the upstream and downstream ends of duct 1 to a source of fluid and to an extension, flexible or not.

The operation of the device is the following.

In a way known per se, when rotor 4 is rotated about axis Z, material 8 is continuously carried along from inlet chamber 9 up to the other axial end of the pump, the rotation of this rotor being effective to axially push back the volumes of said material which are contained immediately downstream of the rotorstator contact line in the spaces between two elements.

After reaching the axial end of pump 3 opposite chamber 4, the powdery material is discharged along the spout 13 into duct 1 by gravity and suction effects, possibly assisted by the driving effect due to the jet of pressurised fluid admitted through pipe 19: it is then transported in said duct 1 by fluid 2 to the desired distance.

The fluid introduced by pipe 19 may be identical to fluid 2 or may differ therefrom.

Following which, and whatever the embodiment adopted, there is finally obtained a device for the remote transport of measured amounts of a powdery product, a device which presents a certain number of advantages in relation to those already known:

in particular the transport of said product may be effected over a great distance reaching and even exceeding 100 m, moreover the use of a screw pump in the sense defined hereabove permits continuous working, an accurate measurement of the amount fed and the use as transport fluid of a relatively highly pressurised gas, or even of a liquid.

As is evident, and as it follows moreover already from what has gone before, the invention is in no wise limited to those of its embodiments and modes of application which have been more specially considered; it covers, on the contray, all variations thereof.

We claim:

1. A device for the remote distribution of measured amounts of a powdery material, comprising: a wall defining a transport duct having an axis, means for circulating a carrier fluid in said duct, a feed regulator mounted so as to feed into said duct said measured amounts and having an eccentric screw pump with an outlet, a pouring spout having an upstream end connected to the pump outlet and a downstream discharge end disposed inside the duct, the spout being downwardly turned and plunging laterally into the transport duct through an opening provided in the upper wal thereof with the spout downwardly converging in the shape of a truncated cone, the downstream discharge end of the duct having an edge defining a discharge opening extending in an ellipse with a small horizontal axis situated in a plane sloping with respect to the axis of the duct, said horizontal axis passing through said ellipse and being surrounded over the whole of its periphery by the flow of carrier fluid, and the carrier fluid being admitted axially into the duct upstream of said opening.

* * * * *